(12) United States Patent
Brink et al.

(10) Patent No.: US 7,631,667 B2
(45) Date of Patent: Dec. 15, 2009

(54) HOSE WITH INTEGRAL COUPLING AND METHOD FOR PRODUCING THE SAME

(75) Inventors: Burghard Brink, Rosengarten (DE); Tibor Nagy, Budapest (HU); Andras Boros, Budapest (HU)

(73) Assignees: Eddelbuttel + Schneider GmbH, Hamburg (DE); Phoenix Rubber Industrial Ltd., Szeged (HU)

( * ) Notice: Subject to any disclaimer, the term of this patent is extended or adjusted under 35 U.S.C. 154(b) by 525 days.

(21) Appl. No.: 10/547,876

(22) PCT Filed: Feb. 13, 2004

(86) PCT No.: PCT/DE2004/000267

§ 371 (c)(1),
(2), (4) Date: Apr. 25, 2006

(87) PCT Pub. No.: WO2004/079249

PCT Pub. Date: Sep. 16, 2004

(65) Prior Publication Data

US 2006/0201566 A1    Sep. 14, 2006

(30) Foreign Application Priority Data

Mar. 4, 2003    (DE) ................................. 103 09 562

(51) Int. Cl.
*F16L 9/00*    (2006.01)
(52) U.S. Cl. ......................... 138/109; 138/104; 285/47; 285/222.2
(58) Field of Classification Search ................. 138/109, 138/110, 104; 156/188

See application file for complete search history.

(56) References Cited

U.S. PATENT DOCUMENTS 2,146,218 A * 2/1939 Kimmich et al. ......... 285/222.2

(Continued)

FOREIGN PATENT DOCUMENTS

DE    12 12 371    3/1966

(Continued)

*Primary Examiner*—Patrick F Brinson
(74) *Attorney, Agent, or Firm*—Collard & Roe, P.C.

(57) ABSTRACT

The invention relates to a hose that comprises at least one inner layer (1) produced from an elastomer material, an embedded reinforcement carcass produced from a textile and/or metal material, an outer layer produced from an elastomer material and a coupling having a flange section inside the hose end. The inventive hose is characterized in that the coupling comprises a fitting, a supporting flange and at least one annular lamina. A first reinforcement carcass, consisting of at least one reinforcement layer, extends along the entire inside of the fitting and changes in the flange area from the axial to the radial direction of extension. The radial area of the first reinforcement carcass is mounted between the supporting flange and the annular lamina(e). A second reinforcement carcass, likewise consisting of at least one reinforcement layer, partially or completely holds the outside of the fitting, especially by way of fastening means. A filler material produced from an elastomer material, in the area of the fitting, fills the space between the first and the second reinforcement carcass. The coupling is integrated into the hose in such a manner that all hose components associated with the coupling give a material-fit hose/coupling system. The invention also relates to a method for producing a hose of the above-described type.

28 Claims, 2 Drawing Sheets

U.S. PATENT DOCUMENTS

Figure 1:
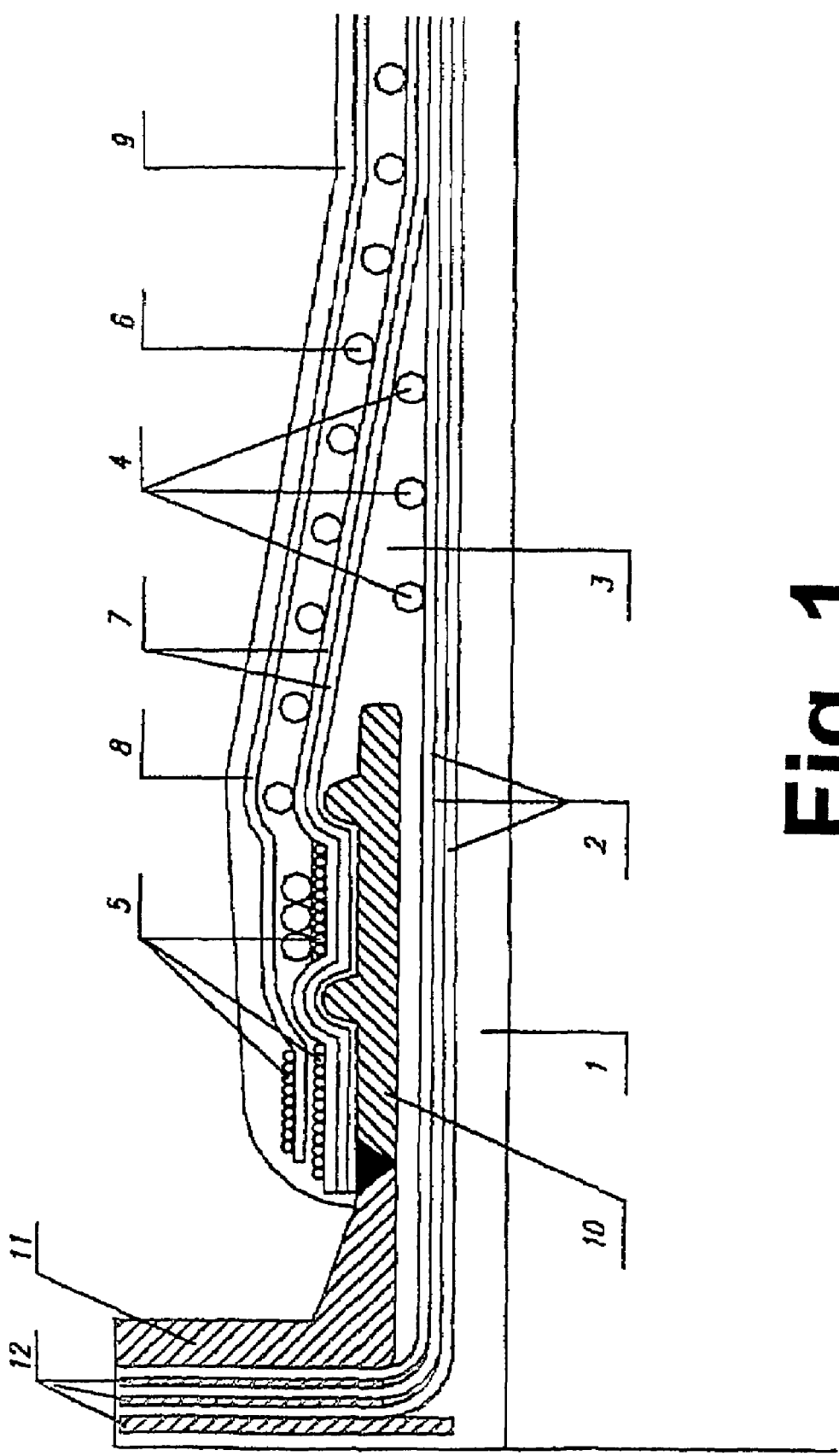

| | | | |
|---|---|---|---|
| 3,415,545 A | | 12/1968 | Frey |
| 4,225,158 A | * | 9/1980 | Puechavy .................... 285/47 |
| 4,234,019 A | * | 11/1980 | Hornor et al. ............... 138/109 |
| 4,259,553 A | * | 3/1981 | Tanaka et al. ............ 200/81 R |
| 4,366,842 A | * | 1/1983 | Peavy et al. ................. 138/109 |
| 4,465,105 A | * | 8/1984 | Slater ........................ 138/104 |
| 4,509,558 A | * | 4/1985 | Slater ........................ 138/104 |
| 5,518,034 A | * | 5/1996 | Ragout et al. ............... 138/104 |
| 5,654,499 A | * | 8/1997 | Manuli .................... 73/40.5 R |
| 6,070,617 A | * | 6/2000 | Honda et al. ................ 138/104 |

FOREIGN PATENT DOCUMENTS

| | | | |
|---|---|---|---|
| DE | 4005717 A1 | | 9/1990 |
| GB | 1 453 999 B | | 5/1974 |
| GB | 2 272 738 A | | 11/1993 |
| NL | 7417619 A | * | 11/1974 |

* cited by examiner

HOSE WITH INTEGRAL COUPLING AND METHOD FOR PRODUCING THE SAME

CROSS REFERENCE TO RELATED APPLICATIONS

Applicants claim priority under 35 U.S.C. §119 of German Application No. 103 09 562.4 filed Mar. 4, 2003. Applicants also claim priority under 35 U.S.C. §365 of PCT/DE2004/000267 filed Feb. 13, 2004. The international application under PCT article 21(2) was not published in English.

The invention relates to a hose, consisting at least of:
an inner layer of an elastomer material;
an embedded reinforcement carrier of a textile and/or metallic material;
an outer layer of an elastomer material; as well as
a coupling having a flange region within the hose end.

A hose of this type is described, for example, in the patent GB 1 453 999 B, and the allowed patent application published for public scrutiny DE 40 05 717 A1, specifically having a coupling design on the basis of a supporting flange and several annular lamellae. The allowed patent application published for public scrutiny GB 2 272 738 A also discloses a hose of this type, but here, the coupling consists of a flange and a nipple.

The weak point of such hoses is, in general, the transition from the rigid part to the flexible part, specifically independent of the aforementioned coupling design.

The task of the invention now consists of making available a hose of this type, in which a smooth modular transition from the rigid part to the flexible part is guaranteed, so that the ability of the hose to withstand pressure stress and its useful lifetime are increased. Furthermore, a reduction in length of the rigid hose part is supposed to be made possible, as compared with the nipple coupling design known up to this time.

The coupling comprises a nipple, a supporting flange, and at least one annular lamella;
a first reinforcement carrier that consists of at least one reinforcement layer runs along the entire inside of the nipple, and makes a transition from the axial to the radial direction of extension in the flange region, whereby the radial region of the first reinforcement carrier is attached between the supporting flange and the annular lamella(e);
a second reinforcement carrier that also consists of at least one reinforcement layer, partially or completely holds the outside of the nipple with its end;
a filler material of elastomer material fills the space between the first and the second reinforcement carrier in the region of the nipple; and
the coupling is built into the hose in such a manner that all of the hose components associated with the coupling result in a hose/coupling system produced with a material lock.

Furthermore, the task of the invention is to make available a method for the production of the new hose.

The method of the new hose with built-in coupling is now characterized by the following method steps:
the inner layer is built up around a rigid mandrel;
the first reinforcement carrier is then applied to the inner layer;
the coupling, comprising nipple, supporting flange, and annular lamella(e), is now drawn onto the first reinforcement carrier;
subsequently, the filler material is introduced, if necessary with the installation of at least one reinforcement ring;
now the application of the second reinforcement carrier takes place, particularly with simultaneous anchoring by means of an attachment means on the outside of the nipple;
subsequently, the outer layer is applied, if necessary with the installation of at least one spiral wire, a textile covering, as well as an attachment means for these additional components;
finally, vulcanization takes place, specifically with the formation of a hose-coupling system produced with a material lock.

The elastomer material of the inner layer, the outer layer, the filler material, and the intermediate layers comprises rubber or a rubber-like material, including thermoplastic elastomers.

Figure 2:
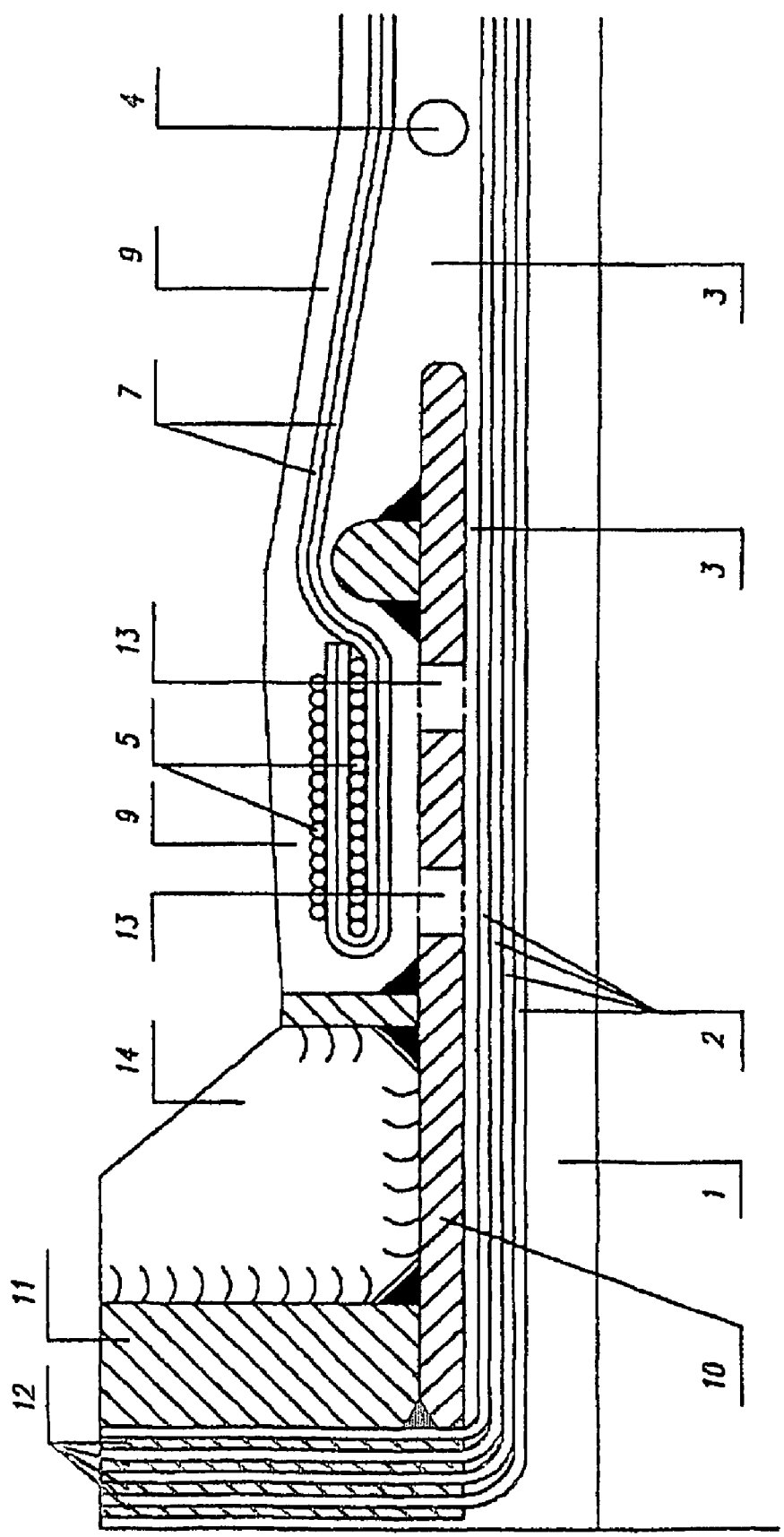

The invention will now be explained using two exemplary embodiments, making reference to schematic drawings. These show:

FIG. 1 a hose having a built-in coupling, which has not only the first and second reinforcement carrier but also additional reinforcement rings, a spiral wire, and a textile covering;

FIG. 2 a hose having a built-in coupling as well as having a first and second reinforcement carrier and additional reinforcement rings, whereby the nipple has openings.

The hose according to FIG. 1 consists of an inner layer 1 that is also referred to as a hose core, a first reinforcement carrier 2, a filler material 3, reinforcement rings 4, an attachment means 5, a spiral wire 6, a second reinforcement carrier 7, a textile covering 8, an outer layer 9, which is also referred to as a hose cover, furthermore a nipple 10, which is attached to the supporting flange 11, and three annular lamellae 12. The end of the first reinforcement carrier 2 is attached in the flange region between the supporting flange 11 and the adjacent annular lamella 12, or between two annular lamellae 12, respectively. The second reinforcement carrier 7 is connected with the nipple 10 by means of a vulcanization bond and/or by means of binding wire. In an advantageous embodiment of the invention, the hose body is furthermore additionally reinforced by means of relatively rigid reinforcement rings 4 made of metal, fiber-reinforced plastic, or another suitable material. These reinforcement rings 4 can be disposed along the entire hose or only along part of it, depending on the strength requirements. If necessary, the spiral wire 6 can be built into the hose body or into a part of the hose body, and covered with a textile covering 8, which in turn is completely mantled with elastomer material.

Such a hose has an excellent internal pressure holding capacity, since the first reinforcement carrier 2 is present as the main reinforcement at the smallest possible diameter, along the entire hose, and is firmly anchored between the annular lamellae 12 and the supporting flange 11. The tension of the first reinforcement carrier 2 is less in the flange region, as compared with the hose described in the patent GB 1 453 999 B, since this first reinforcement carrier is located below the nipple 11 and the supporting flange 12, and the forces are partially transferred to the nipple 11. The nipple 11 can be shorter than in the case of conventional nipple couplings, since only a segment of the reinforcement is attached on its outside. In an advantageous embodiment of the invention, the second reinforcement carrier 7 does not cover the entire hose body, but rather merely serves as a neck reinforcement. A particular advantage of the invention consists in the fact that a plurality of different neck reinforcement designs is possible. Additional rigid reinforcement rings 4 having different thickness can be built in. In addition, the longitudinal distance between these reinforcement rings can be varied over the hose length, to achieve an optimal bending resistance distribution.

The stated designs serve as built-in bending stiffeners, so that a smooth modular transition to the coupling or rigid pipe connection is achieved.

A significant partial characteristic of the invention is that the end of the nipple 10 lies above the first reinforcement carrier 2, so that the stress in the elastomer material at the end of the nipple is less than in the case of conventional hoses. It is known in the art that the critical weak point of the elastomer material is at the end of the nipple, in the case of hoses having a built-in nipple.

In an embodiment of the invention, the nipple 10 contains several openings 13 (FIG. 2), for example round bores or cut-outs, so that the elastomer can flow between the inside and the outside of the nipple during vulcanization, which guarantees a uniform pressure distribution in the hose during vulcanization.

In the following, the method for the production of the new hose will be described.

The hose mandrel is cleaned and treated with a parting agent. The inner layer 1 is wrapped around the mandrel in a slightly greater length than the predetermined length of the hose. Alternatively, the inner layer can be extruded onto the mandrel. The first reinforcement carrier 2 is laid onto the inner layer at a predetermined laying angle. This reinforcement carrier is preferably a woven fabric on the basis of cord filaments, which is additionally rubberized. The first reinforcement carrier 2 is made slightly longer than the final hose length. In order to facilitate separation, a nylon sheath or silicon paper can be applied to a segment that is located outside the final hose length. The required reinforcement rings 4 are loosely placed on the hose body, preferably approximately in the middle of the hose. The coupling part that contains the nipple 10 and the supporting flange 11 is disposed on the hose body within the coupling region, in such a manner that the ends remain free. The coupling region is filled with filler material 3 up to a diameter that almost corresponds to the inside diameter of the nipple 10. Then the coupling part with the nipple 10 and the supporting flange 11 are pulled into their final position. The free ends of one or more reinforcement layers of the first reinforcement carrier 2 are pulled upward and pressed against the surface of the supporting flange 11. Then an annular lamella 12 is placed on, and the procedure is repeated until all of the reinforcement layers of the first reinforcement carrier 2 are fixed in place between annular lamellae 12. The front surface of the last annular lamella 12 can be covered with an elastomer material, if necessary. A mold plate (not shown here) is clamped onto the supporting flange 11, in order to put the elastomer material and the reinforcement layers between the annular lamellae 12 and the supporting flange 11 under pressure. The mold plate can be attached to the mandrel. The reinforcement rings 4 are moved to their final position, and the required amount of filler material 3 is introduced. Then the second reinforcement carrier 7 is built up.

The second reinforcement carrier 7 is attached to the nipple 10 using a binding wire 5. If necessary, a spiral wire 6 can be laid on and anchored using an attachment means. The textile covering 8 and the outer layer 9 are produced. The hose is wrapped with nylon and vulcanized.

The advantageous characteristics of a hose produced in this manner can particularly be used in the case of large hoses having an inside diameter of typically more than 150 mm, and in the high-performance sector, for example in the case of dipper dredgers, as well as oil suctioning and removal procedures. Examples are hoses directly attached to mono-buoys, specifically buoy discharge hoses and under-buoy hoses. Other applications are regions where a hose or a hose line is connected with rigid pipes, for example full-chamber discharge hoses, railing hoses, or dredger hoses, as well as hoses in water intake systems.

Another exemplary embodiment is presented in connection with FIG. 2, specifically indicating quantitative data, but this does not limit the scope of the invention.

The inside diameter of the hose (mantle) is 800 mm, the length is 2.2 m for intake and transport operation. The thickness of the inner layer 1 is 25 mm. The first reinforcement carrier 2 consists of a heavy woven fabric on the basis of polyester cords at a laying angle of 45 degrees. In this connection, a total of four pairs is used. The end of each pair is attached between annular lamellae 12 and supporting flange 11, in each instance. The total of 4 annular lamellae 12 consist of carbon steel plates having a thickness of 4 mm. Under the nipple, there is an intermediate layer having a thickness of 5 mm, as part of the filler material 3. The nipple 10 contains 24 bores 13 having a diameter of 25 mm, which are disposed distributed in the circumference direction, in two rows, at essentially uniform intervals. Each bore is filled with elastomer material. A total of 15 reinforcement rings 4 are uniformly distributed on the hose body, between the two couplings. The region between these reinforcement rings is filled with filler material 3. Two pairs of the reinforcement layers of the second reinforcement carrier 7 also consist of a heavy woven fabric of the type indicated above, and are attached to the nipple with binding wire 5. The hose body is covered with an outer layer 9 having a thickness of about 10 mm. The supporting flange 11 is welded to the nipple 10 and is carried by a support device 14 in the form of 8 support plates made of steel, which are disposed distributed uniformly over the circumference.

REFERENCE SYMBOL LIST 1 inner layer
2 first reinforcement carrier (reinforcement layers)
3 filler material
4 reinforcement rings
5 attachment means (binding wire)
6 spiral wire
7 second reinforcement carrier (reinforcement layers)
8 textile covering
9 outer layer
10 nipple
11 supporting flange
12 annular lamellae
13 opening (bores)
14 support device (support plates)

The invention claimed is:

1. Hose comprising:
an inner layer (1) of an elastomer material;
an embedded reinforcement carrier (2, 4, 6, 7) of a textile and/or metallic material;
an outer layer (9) of an elastomer material; as well as
a coupling having a flange region within the hose end;
wherein
the coupling comprises a nipple (10), a supporting flange (11), and at least one annular lamella (12) comprising a plate made of steel or of a material having similar strength properties;
a first reinforcement carrier (2) that consists of at least one reinforcement layer runs along the entire inside of the nipple (10), and makes a transition from the axial to the radial direction of extension in the flange region, whereby the radial region of the first reinforcement carrier (2) is attached between the supporting flange (11) and the annular lamella(e) (12);

a second reinforcement carrier (7) that also consists of at least one reinforcement layer partially or completely holds the outside of the nipple (10) with its end;

a filler material (3) of elastomer material fills the space between the first and the second reinforcement carrier (2, 7) in the region of the nipple (10); and the coupling is built into the hose in such a manner that all of the hose components associated with the coupling result in a hose/coupling system produced with a material lock.

2. Hose according to claim 1, wherein the first reinforcement carrier (2) consists of at least two reinforcement layers.

3. Hose according to claim 2, wherein the first reinforcement carrier (2) consists of two to four reinforcement layers.

4. Hose according to claim 2, wherein the number of annular lamellae (12) is equal to the number of reinforcement layers, whereby an annular lamella is disposed between two reinforcement layers.

5. Hose according to claim 1, wherein the annular lamella (12) is a carbon steel plate.

6. Hose according to claim 1, wherein an intermediate layer of elastomer material is present between the first reinforcement carrier (2) and the inside of the nipple (10), which forms a one-piece system with the filler material (3).

7. Hose according to claim 1, wherein the second reinforcement carrier (7) consists of at least two reinforcement layers.

8. Hose according to claim 1, wherein the second reinforcement carrier (7) is anchored on the outside of the nipple (10) by means of an attachment means (5).

9. Hose according to claim 8, wherein the attachment means (5) consists of a binding wire.

10. Hose according to claim 8, wherein the end of the second reinforcement carrier (7) completely or partially surrounds the attachment means (5).

11. Hose according to claim 1, wherein the nipple (10) is equipped with at least one projection that runs in ring shape, on its outside.

12. Hose according to claim 1, wherein the first and second reinforcement carriers (2, 7) consist of a woven fabric, particularly a heavy woven fabric.

13. Hose according to claim 12, wherein the woven fabric filaments, particularly in the form of cords or ropes, consist of polyester.

14. Hose according to claim 1, wherein the second reinforcement carrier (7) does not cover the entire hose body, but rather serves as a neck reinforcement.

15. Hose according to claim 1, wherein it has an additional reinforcement carrier in the form of at least one reinforcement ring (4).

16. Hose according to claim 15, wherein at least one reinforcement ring (4) is disposed exclusively in the region of the nipple (10), specifically within the filler material (3) and/or the attachment region of the second reinforcement carrier (7).

17. Hose according to claim 15, wherein the reinforcement ring (4) consists of metal, fiber-reinforced plastic, or a material having similar strength properties.

18. Hose according to claim 1, further comprising an additional reinforcement carrier in the form of at least one spiral wire (6), whereby the spiral wire covers the hose completely or in sections.

19. Hose according to claim 18, wherein the spiral wire (6) consists of metal.

20. Hose according to claim 18, wherein the spiral wire (6) runs above the second reinforcement carrier (7).

21. Hose according to claim 18, wherein the spiral wire (6) is provided with a textile covering (8).

22. Hose according to claim 21, wherein the textile covering (8) is disposed within the outer layer (9), so that the textile covering is completely mantled with elastomer material.

23. Hose according to claim 1, wherein the nipple (10) and the supporting flange (11) are welded to one another.

24. Hose comprising:

an inner layer (1) of an elastomer material;

an embedded reinforcement carrier (2, 4, 6, 7) of a textile and/or metallic material;

an outer layer (9) of an elastomer material; as well as a coupling having a flange region within the hose end;

wherein the coupling comprises a nipple (10), a supporting flange (11), and at least one annular lamella (12), the nipple (10) having at least one opening extending from the outside of the nipple to its inside;

a first reinforcement carrier (2) that consists of at least one reinforcement layer runs along the entire inside of the nipple (10), and makes a transition from the axial to the radial direction of extension in the flange region, whereby the radial region of the first reinforcement carrier (2) is attached between the supporting flange (11) and the annular lamella(e) (12);

a second reinforcement carrier (7) that also consists of at least one reinforcement layer partially or completely holds the outside of the nipple (10) with its end;

a filler material (3) of elastomer material fills the space between the first and the second reinforcement carrier (2, 7) in the region of the nipple (10); and the coupling is built into the hose in such a manner that all of the hose components associated with the coupling result in a hose/coupling system produced with a material lock.

25. Hose according to claim 24, wherein several openings (13) are present, which are disposed distributed in the circumference direction of the nipple (10).

26. Hose comprising:

an inner layer (1) of an elastomer material;

an embedded reinforcement carrier (2, 4, 6, 7) of a textile and/or metallic material;

an outer layer (9) of an elastomer material; as well as a coupling having a flange region within the hose end;

wherein the coupling comprises a nipple (10), a supporting flange (11), and at least one annular lamella (12);

a first reinforcement carrier (2) that consists of at least one reinforcement layer runs along the entire inside of the nipple (10), and makes a transition from the axial to the radial direction of extension in the flange region, whereby the radial region of the first reinforcement carrier (2) is attached between the supporting flange (11) and the annular lamella(e) (12);

a second reinforcement carrier (7) that also consists of at least one reinforcement layer partially or completely holds the outside of the nipple (10) with its end;

a third reinforcement carrier in the form of a plurality of reinforcement rings (4);

a filler material (3) of elastomer material fills the space between the first and the second reinforcement carrier (2, 7) in the region of the nipple (10); and the coupling is built into the hose in such a manner that all of the hose components associated with the coupling result in a hose/coupling system produced with a material lock;

wherein the reinforcement rings (4) are arranged with a distribution over the hose length between two couplings and extend within an intermediate layer of elastomeric material that is located between the first and the second reinforcement carriers (2, 7), the intermediate layer in turn forming a one piece composite system with the filler material (3).

27. Hose comprising:
    an inner layer (1) of an elastomer material;
    an embedded reinforcement carrier (2, 4, 6, 7) of a textile and/or metallic material;
    an outer layer (9) of an elastomer material; as well as
    a coupling having a flange region within the hose end;
    wherein
    the coupling comprises a nipple (10), a supporting flange (11), and at least one annular lamella (12) comprising a plate made of steel or of a material having similar strength properties;
    a first reinforcement carrier (2) that consists of at least one reinforcement layer runs along the entire inside of the nipple (10), and makes a transition from the axial to the radial direction of extension in the flange region, whereby the radial region of the first reinforcement carrier (2) is attached between the supporting flange (11) and the annular lamella(e) (12);
    a second reinforcement carrier (7) that also consists of at least one reinforcement layer partially or completely holds the outside of the nipple (10) with its end;
    a third reinforcement carrier in the form of at least one spiral wire (6) provided with a textile covering (8), whereby the spiral wire covers the hose completely or in sections and the textile covering (8) is anchored on the nipple (10) by means of an attachment means (5);
    a filler material (3) of elastomer material fills the space between the first and the second reinforcement carrier (2, 7) in the region of the nipple (10); and
    the coupling is built into the hose in such a manner that all of the hose components associated with the coupling result in a hose/coupling system produced with a material lock.

28. Hose comprising:
    an inner layer (1) of an elastomer material;
    an embedded reinforcement carrier (2, 4, 6, 7) of a textile and/or metallic material;
    an outer layer (9) of an elastomer material; as well as
    a coupling having a flange region within the hose end;
    wherein
    the coupling comprises a nipple (10), a supporting flange (11), and at least one annular lamella (12) comprising a plate made of steel or of a material having similar strength properties;
    a first reinforcement carrier (2) that consists of at least one reinforcement layer runs along the entire inside of the nipple (10), and makes a transition from the axial to the radial direction of extension in the flange region, whereby the radial region of the first reinforcement carrier (2) is attached between the supporting flange (11) and the annular lamella(e) (12);
    a second reinforcement carrier (7) that also consists of at least one reinforcement layer partially or completely holds the outside of the nipple (10) with its end;
    a filler material (3) of elastomer material fills the space between the first and the second reinforcement carrier (2, 7) in the region of the nipple (10);
    the coupling is built into the hose in such a manner that all of the hose components associated with the coupling result in a hose/coupling system produced with a material lock; and
    the supporting flange (11) is provided with a support device (14) distributed uniformly over the circumference.

* * * * *

UNITED STATES PATENT AND TRADEMARK OFFICE
CERTIFICATE OF CORRECTION

PATENT NO.      : 7,631,667 B2                    Page 1 of 1
APPLICATION NO. : 10/547876
DATED           : December 15, 2009
INVENTOR(S)     : Brink et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Second Day of November, 2010

David J. Kappos
*Director of the United States Patent and Trademark Office*